UNITED STATES PATENT OFFICE.

HEINRICH MIELCK, OF NEW YORK, N. Y., ASSIGNOR TO MIELCK'S STONE AND TERRA COTTA COMPANY, A CORPORATION OF NEW YORK.

COMPOSITION FOR ARTIFICIAL STONE.

SPECIFICATION forming part of Letters Patent No. 711,254, dated October 14, 1902.

Application filed June 11, 1901. Renewed May 26, 1902. Serial No. 108,996. (No specimens.)

*To all whom it may concern:*

Be it known that I, HEINRICH MIELCK, a citizen of the United States of Brazil, residing in New York, borough of Manhattan, in the State of New York, have invented certain new and useful Improvements in Compositions for Artificial Stone, of which the following is a specification.

This invention relates to an improved composition for artificial stone, in which besides sand, burnt magnesia, and chlorid of magnesium, kaolin or porcelain-clay is employed, so that artificial stone in the nature of porcelain-stones can be produced without burning the same in a kiln, as heretofore. Kaolin-stones were heretofore made by burning the same in specially-constructed kilns. The process, however, is not only expensive, but requires also a considerable length of time, usually from eight to fourteen days, before the bricks are thoroughly finished and dried. These objections are all obviated by my improved composition, by which the artificial stone can be made at ordinary temperature within a period of from twelve to sixteen hours.

The invention consists of a composition for making artificial stone consisting of kaolin, sand, burnt magnesia, and a concentrated solution of magnesium chlorid. These substances are mixed together according to the following proportions: two parts, by weight, of kaolin, one part, by weight, of fine white sand, one part, by weight, of burnt magnesia, and one part, by weight, of magnesium chlorid dissolved in water, so as to form a concentrated solution. These substances are intimately mixed and then either cast into forms, pressed, or tamped, according to the stone to be produced. A greater or less quantity of water is used, according as the mass is to be subjected to a casting, pressing, or tamping operation.

I have found by practical experience that natural magnesite, burned and subjected to several grinding operations so as to produce it in a very fine powder, is preferable for producing the proper quality of stone. The finer the burnt magnesia used the better it is adapted for the binding of the sand and kaolin. The reaction in the mass takes about twelve hours, the composition setting and hardening within this time. When a clear white color is desired, zinc oxid or any other white metallic oxid is used; but when any other color is desired a corresponding metallic pigment has to be added to the mass. For some purposes it is necessary to produce a very light-weight kaolin-stone, and this may be obtained by adding to the mass a smaller or greater quantity of vegetable fibers. The proportions of the mass may be changed within certain limits, according to the special applications for which the artificial stone is to be used.

Having thus described my invention, I claim as new and desire to secure by Letters Patent—

1. A composition for artificial stone, consisting of kaolin, sand, burnt magnesia, and a solution of magnesium chlorid, substantially as set forth.

2. A composition for artificial stone, consisting of two parts by weight of kaolin, one part of sand, one part of burnt magnesia, and one part of magnesium chlorid dissolved in water, substantially as set forth.

In testimony that I claim the foregoing as my invention I have signed my name in presence of two subscribing witnesses.

HEINRICH MIELCK.

Witnesses:
PAUL GOEPEL,
JOSEPH H. NILES.